(12) United States Patent
Parsons et al.

(10) Patent No.: US 7,890,602 B1
(45) Date of Patent: Feb. 15, 2011

(54) TOOLS ENABLING PREFERRED DOMAIN POSITIONING ON A REGISTRATION WEBSITE

(75) Inventors: Robert Parsons, Scottsdale, AZ (US); Barbara Rechterman, Cave Creek, AZ (US); Micheal Zimmerman, Scottsdale, AZ (US); James Bladel, Le Claire, IA (US); Richard Merdinger, Coralville, IA (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 0 days.

(21) Appl. No.: 12/636,412

(22) Filed: Dec. 11, 2009

(51) Int. Cl.
*G06F 15/16* (2006.01)

(52) U.S. Cl. .................. 709/218; 705/14.54; 705/10; 705/14.4; 705/14.43; 707/999.1; 424/145.1; 514/2.5

(58) Field of Classification Search ............. 709/218; 705/14.54, 14.4, 10; 707/999.1; 424/145.1; 514/2.5
See application file for complete search history.

(56) References Cited

U.S. PATENT DOCUMENTS

| | | | |
|---|---|---|---|
| 6,338,082 B1 | 1/2002 | Schneider | |
| 6,745,248 B1 | 6/2004 | Gardos et al. | |
| 6,901,436 B1 | 5/2005 | Schneider | |
| 6,973,505 B1 | 12/2005 | Schneider | |
| 7,188,138 B1 | 3/2007 | Schneider | |
| 7,194,552 B1 | 3/2007 | Schneider | |
| 7,238,661 B2 * | 7/2007 | Glynn et al. | 424/145.1 |
| 7,548,929 B2 * | 6/2009 | Collins et al. | 1/1 |
| 7,809,605 B2 * | 10/2010 | Tonse et al. | 705/14.54 |
| 2002/0065903 A1 | 5/2002 | Fellman | |
| 2002/0091703 A1 | 7/2002 | Bayles | |
| 2002/0091827 A1 | 7/2002 | King | |
| 2004/0068460 A1 | 4/2004 | Feeley | |
| 2004/0162916 A1 | 8/2004 | Ryan | |
| 2004/0167982 A1 | 8/2004 | Cohen | |
| 2004/0199493 A1 | 10/2004 | Ruiz | |
| 2004/0199608 A1 | 10/2004 | Rechterman | |
| 2005/0102354 A1 | 5/2005 | Hollenbeck | |
| 2005/0114484 A1 | 5/2005 | Wilson | |
| 2006/0161682 A1 | 7/2006 | King | |
| 2006/0271668 A1 | 11/2006 | Parsons | |

\* cited by examiner

*Primary Examiner*—Tammy T Nguyen
(74) *Attorney, Agent, or Firm*—Karl A. Fazio

(57) ABSTRACT

The present inventions may be implemented by tools enabling preferred domain positioning on a registration website. An example may comprise a computer-readable media storing instructions that, when executed by a server computer, cause the server to receive a bid from a registry seeking such preferred placement for a domain (that may be administered by the registry), generate a quality score for the domain, and determine the preferred placement based upon the bid and the quality score.

45 Claims, 10 Drawing Sheets ent # US 7,890,602 B1

TOOLS ENABLING PREFERRED DOMAIN POSITIONING ON A REGISTRATION WEBSITE

CROSS REFERENCE TO RELATED PATENT APPLICATIONS

This patent application is related to U.S. patent application Ser. No. 12/636/394 entitled: "Methods for Determining Preferred Domain Positioning on a Registration Website" concurrently filed herewith and also assigned to The Go Daddy Group, Inc.

FIELD OF THE INVENTION

The present inventions generally relate to domain registration and, more particularly, methods and tools for determining and enabling preferred domain positioning on a registration website.

SUMMARY OF THE INVENTION

An example embodiment of a method for determining preferred domain positioning on a registration website may comprise the steps of receiving a bid from a registry seeking such preferred placement for a domain that may be administered by the registry, generating a quality score for the domain, and determining the preferred placement based upon the bid and the quality score.

An example embodiment of a tool for enabling preferred domain positioning on a registration website may comprise a computer-readable media storing instructions that, when executed by a server computer, cause the server to receive a bid from a registry seeking such preferred placement for a domain (that may be administered by the registry), generate a quality score for the domain, and determine the preferred placement based upon the bid and the quality score.

The above features and advantages of the present inventions will be better understood from the following detailed description taken in conjunction with the accompanying drawings.

DETAILED DESCRIPTION

Figure 1:
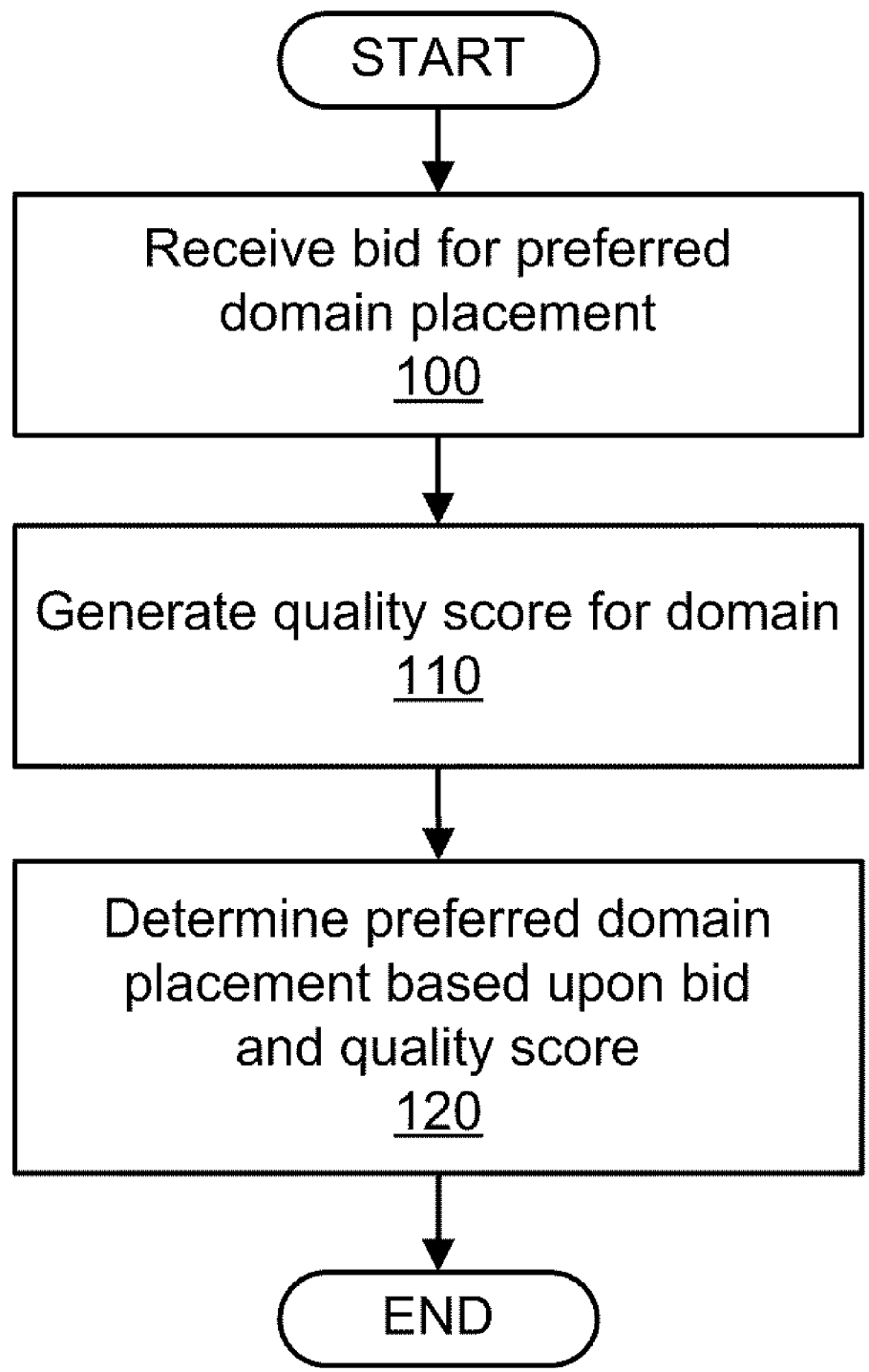
FIG. 1 is a flow diagram illustrating a possible embodiment of a method for determining preferred domain positioning on a registration website.

The present inventions will now be discussed in detail with regard to the attached drawing figures which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users.

Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. Prevalent on the Web are multimedia websites, some of which may offer and sell goods and services to individuals and organizations. Websites may consist of a single webpage, but typically consist of multiple interconnected and related webpages. Menus and links may be used to move between different webpages within the website or to move to a different website as is known in the art. The interconnectivity of webpages enabled by the Internet can make it difficult for Internet users to tell where one website ends and another begins. Websites may be created using HyperText Markup Language (HTML) to generate a standard set of tags that define how the webpages for the website are to be displayed.

Websites, unless extremely large and complex or have unusual traffic demands, typically reside on a single server and are prepared and maintained by a single individual or entity. Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

The domain name system (DNS) is the world's largest distributed computing system that enables access to any resource on the Internet by translating user-friendly domains to IP addresses. The process of translating domains to IP addresses is known as Name Resolution. A DNS name resolution is the first step in the majority of Internet transactions. The DNS is a client-server system that provides this name resolution service through a family of servers called Domain Name Servers. The hierarchical domain space is divided into administrative units called zones. A zone usually consists of a domain (e.g., example.com) and possibly one or more subdomains (e.g., projects.example.com, services.example.com). The authoritative data needed for performing the name resolution service is contained in a file called the zone file and the DNS servers hosting this file are called the authoritative name servers for that zone. The DNS clients that make use of the services provided by authoritative name servers may be of two types. One type is called a stub resolver that formulates and sends a query every time it receives a request from an application that requires Internet service (e.g., a browser). The other type is called a caching (also called recursive/resolving) name server that caches the name resolution responses it has obtained from the authoritative name servers and is thus able to serve multiple stub resolvers.

The zone file hosted on an authoritative name server consists of various types of records called Resource Records (RRs). A type (RRtype) is associated with each DNS resource record. The code for these RRtypes is assigned by an international organization called Internet Assigned Names Authority (IRNA). An RR of a given RRtype in a zone file provides a specific type of information. Some of the common RRtype codes are: NS, MX, CNAME, and A. An NS RR in a zone file gives the fully qualified domain name (FQDN) of the host that is considered the name server for that zone. For example, an NS RR in the zone file of the zone example.com may give the information that the host ns1.projects.example.com is a name server for the domain projects.example.com. Similarly an MX RR gives the host name for a mail server for the zone. An A RR gives the IP address for a host in a domain within the zone. CNAME provides "canonical name" records and mapping of names in the zone file. A zone file generally consists of multiple RRs of a given RRtype with some exceptions (e.g., there only can be SOA RR in a zone file). It can also have multiple RRs for the same domain and same (or different) RRtype (e.g., multiple name servers or mail servers for a domain services.example.com).

The DNS infrastructure consists of many different types of DNS servers, DNS clients, and transactions between these entities. An important transaction in DNS is the one that provides the core service of DNS (i.e., name resolution service) and is called the DNS Query/Response. A DNS Query/Response transaction is made up of a query originating from a DNS client (generically called a DNS resolver) and response from a DNS name server. The response consists of one or more RRs. These RRs may be served from its own zone file (for an authoritative name server) or from a cache of RRs obtained from other name servers (for a caching/resolving/recursive name servers). In this way, the DNS serves as a global, distributed database. Name servers (serving zone files) each contain a small portion of the global domain space, and clients issue queries using a domain and a desired RRtype.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain. An example of a URL with a HTTP request and domain is: http://www.companyname.com. In this example, the "http" identifies the URL as a HTTP request and the "companyname.com" is the domain.

Domains are much easier to remember and use than their corresponding IP addresses. The Internet Corporation for Assigned Names and Numbers (ICANN) approves some Generic Top-Level Domains (gTLD) and delegates the administrative responsibility to a particular organization (a "registry") for maintaining an authoritative source for the registered domains within a TLD and their corresponding IP addresses. Such a registry may comprise any registry or other entity under contract (or other agreement) with ICANN to administer one or more TLDs, a registry operator that may comprise any entity sub-contracted with the registry to administer the TLD on behalf of the registry and make the TLD available to registrars for registration, and/or any agent operating on behalf of a registry to carry out the registries' contractual obligations with ICANN. For certain TLDs (e.g., .biz, .info, .name, and .org) the registry is also the authoritative source for contact information related to the domain and is referred to as a "thick" registry. For other TLDs (e.g., .com and .net) only the domain, registrar identification, and name server information is stored within the registry, and a registrar is the authoritative source for the contact information related to the domain. Such registries are referred to as "thin" registries. Most gTLDs are organized through a central domain Shared Registration System (SRS) based on their TLD.

The process for registering a domain with .com, .net, .org, or other TLDs allows an Internet user to use an ICANNaccredited registrar to register their domain. For example, if an Internet user, John Doe, wishes to register the domain "mycompany.com," John Doe may initially determine whether the desired domain is available by contacting a domain registrar. The Internet user may make this contact using the registrar's website and typing the desired domain into a field on the registrar's webpage created for this purpose.

Upon receiving the request from the Internet user, the registrar may ascertain whether "mycompany.com" has already been registered by checking the SRS database associated with the TLD of the domain. The results of the search then may be displayed on the registrar's website to thereby notify the Internet user of the availability of the domain. If the domain is available, the Internet user may proceed with the registration process. If the domain is not available for registration, the Internet user may keep selecting alternative domains until an available domain is found. When a domain is registered, the registrar may pay a registration fee to the registry responsible for administering the TLD used by the registered domain. Continuing with the previous paragraph's example, upon registration of the domain "mycompany.com," although the registrar may have collected a fee from the domain registrant, it also may have paid the registry the appropriate registration fee for the allocated .com TLD.

Currently, there are substantially more domain registrars than domain registries. Because of recent rule changes promulgated by ICANN, however, Applicant anticipates growth in the number of TLDs available for domain registration. In summary, ICANN has approved an expansion of the TLD scheme. For example, rather than being limited to a few TLDs that supposedly relate the purpose of the domain (e.g., .com for companies, .org for non-profit organizations, .gov for governmental entities, .edu for educational institutions, etc.), Internet users (who have the proper infrastructure and financial backing to become ICANN-approved) may apply to become the registry for their own TLDs. For example, the city of Scottsdale, Ariz. could operate the .scottsdale TLD and The Go Daddy Group, Inc. could operate the .godaddy TLD.

Under this emerging scheme, TLD registries will need to compete for registrars to offer their TLDs for registration on their domain registration websites. Such TLD registries also will need to compete for preferred placement of their domains on the registrars' domain registration websites. Applicant has determined that presently-existing systems and methods do not provide optimal means for determining and enabling preferred domain positioning on such registrars' registration websites. For these reasons, there is a need for the systems and methods (and related functionality) as described herein.

Methods for Determining Preferred Domain Positioning on a Registration Website

Figure 2:
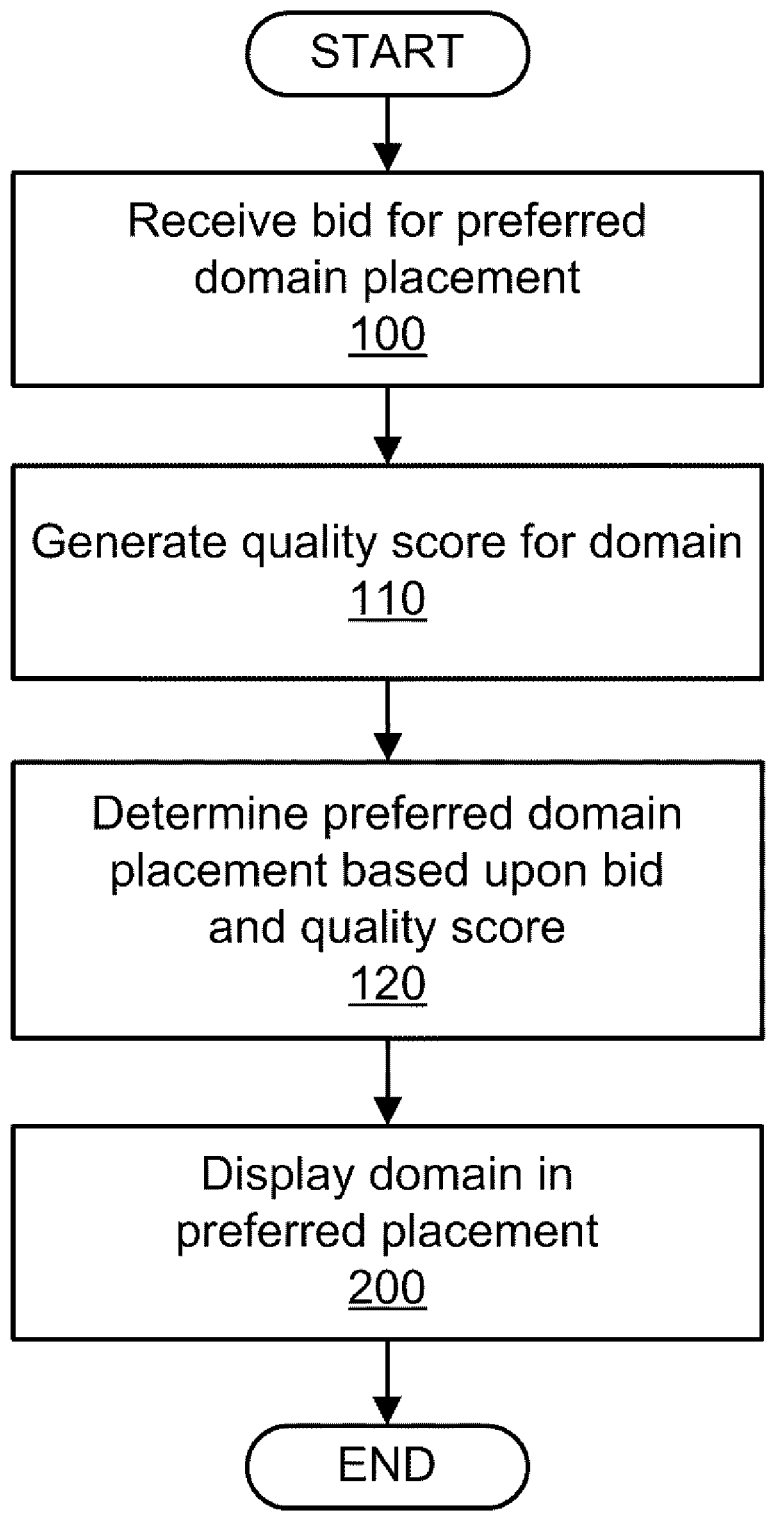
FIG. 2 is a flow diagram illustrating a possible embodiment of a method for determining preferred domain positioning on a registration website.

FIG. 1 illustrates an embodiment of a method for determining preferred domain positioning on a registration website that may, as a non-limiting example, be performed by at least one microprocessor on at least one server computer communicatively coupled to a network and executing a plurality of instructions stored on at least one computer-readable media. The method may comprise the steps of receiving a bid from a registry seeking a preferred placement on a domain registration website for a domain administered by the registry (Step 100), generating a quality score for the domain (Step 110), and determining the preferred placement based upon the bid and the quality score (Step 120). As illustrated in FIG. 2, the method may further comprise displaying the domain on the domain registration website in the preferred placement.

As a non-limiting example, the methods illustrated in FIGS. 1 and 2 (and all methods described herein) may be performed by any central processing unit (CPU) in any computing system, such as a microprocessor running on a server computer, and executing instructions stored (perhaps as scripts and/or software) in computer-readable media accessible to the CPU, such as a hard disk drive on a server computer. Such a server computer may be communicatively coupled to a network (e.g., the Internet) and may receive a bid from a registry seeking a preferred placement on a domain registration website for a domain administered by the registry (Step 100). The domain registration website may comprise any website-enabled domain purchase and/or registration system, such as that described in detail above and/or may be available on GODADDY.COM's website and may be operated by any entity offering domains for registration including, but not limited to, a domain registry, a domain registrar, or a domain reseller. A domain name reseller may comprise any third party under agreement with a registrar for the purpose of reselling the registrar's products and/or services.

The bid may come from any individual or entity desiring to have a domain offered for registration on a domain registration website (e.g., a domain registry, a domain registrar, or a domain reseller). As a non-limiting example, a bidding registry may provide domain registry services, domain registrar services, or both. The bid may comprise any electronic communication or combination of data, perhaps received by a server computer, that seeks preferred placement on a domain registration website including, but not limited to, a Hyper Text Transfer Protocol (HTTP) request, email message, Short Message Service (SMS) message (i.e., text message), or (as described with respect to FIG. 9 below) a function call on an Application Programming Interface (API) running on a server computer.

Alternatively, the bid may be received via other means, such as via a written, typewritten, faxed, or mailed document, or via oral communication. Irrespective of the format in which the bid is received, it may comprise, as non-limiting examples, the domain to be listed on the domain registration website, the requested preferred placement on the domain registration website, the bidder's contact information (e.g., registry name, address, phone number, IP address, email address, etc.) and/or an offer to pay a remuneration for the requested preferred placement. The remuneration offered, suggested, paid, or agreed to be paid in exchange for the requested preferred domain placement may comprise any compensation including, but not limited to, financial compensation. Such financial compensation may be paid on a cost-per-click (e.g., a price paid for each click on the domain listed on the domain registration website), cost-per-impression (e.g., a price paid for each appearance of the domain on the domain registration website), cost-per-acquisition (e.g., a price paid for each domain registration via the domain registration website), flat fee (e.g., a one-time payment), or recurring fee (e.g., monthly or annual) basis.

The illustrated embodiments place no limitation on the format that a domain may take. As non-limiting examples, the domain may comprise a top-level domain (TLD), a generic top-level domain (gTLD), a country code top-level domain (ccTLD), a second-level domain, a premium domain, and/or a suggested domain. A TLD is a domain at the highest level of the DNS. Such TLDs are installed in the root zone of the name space. For lower level domains, the TLD may comprise the last part of the domain (i.e., the phrase following the last dot of the full domain). For example, in www.example.com, the term ".com." is the TLD. A gTLD is a specific category of TLDs maintained by ICANN for use in the DNS that may, as a non-limiting example, include the following TLDs: .aero, .asia, .biz, .cat, .com, .coop, .info, .jobs, .mobi, .museum, .name, .net, .org, .pro, .tel, and/or .travel. ccTLDs may comprise TLDs reserved for use by countries, sovereign states, or a dependent territory (e.g., .us, .de, .tv, .me). A second-level domain may comprise a root name concatenated to a top-level domain administered by a registry. Thus, it may be a domain that is directly below a TLD in the DNS hierarchy. Continuing with the previous example, in www.example.com, the term "example.com" is the second-level domain of the .com TLD. The domain also may comprise any subdomain of a larger domain. Thus, first.example.com and second.example.com are both subdomains of the example.com second-level domain.

A premium domain may comprise any of the above-described domains that may have a market value that is higher than the standard domain registration fee. Such higher market value may result from the premium domain incorporating words commonly searched in search engines, and/or keywords that may cause the premium domain to have a higher ranking on search engines. Premium domains also may have gone through an appraisal to establish their market value. A suggested domain may comprise any domain generated (perhaps by software and/or scripts running on a server computer in response to a customer request) and presented to a customer for registration. Future iterations of the DNS may establish alternate domain formats (perhaps using different alphanumeric structures, latin or non-latin character sets or alphabets, or other scripts in human and/or machine-readable languages (e.g., bar code, IBN, UBC, and/or RFID), or other file types (e.g., image, audio, or video files)) functioning as a domain or a similarly-functioning resource locator, which are explicitly contemplated by this patent application.

Figure 3:
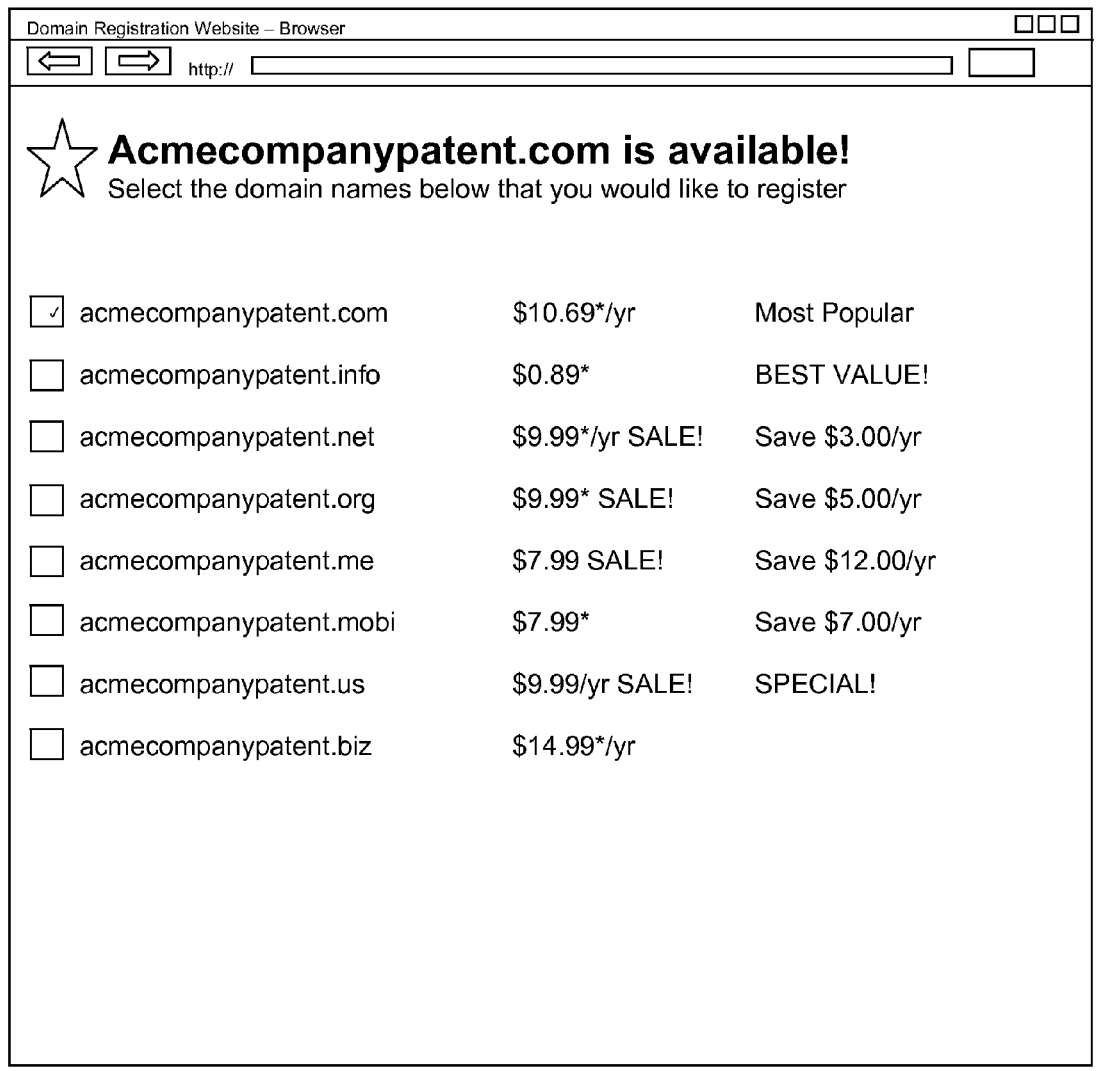
FIG. 3 illustrates a domain registration website.

As described above, the bid received from a registry (Step 100) may be part of a request seeking a preferred placement on a domain registration website for a domain administered by said registry. The preferred placement may comprise any location on the domain registration website that may be more likely to attract the attention of a user than an other location. The preferred placement location, as non-limiting examples, may be determined by human factors, usability, or similar studies, or may be a simple arbitrary or intuitive choice. As illustrated in FIG. 3, it also may comprise a preferred placement within a vertical arrangement of a plurality of domains, perhaps at the top of a list of a plurality of domains, or simply a higher placement within such a list than the placement of other domains. The preferred placement may therefore, as non-limiting examples, comprise a top-most, bottom-most, or more centered position in any such vertical list.

Figure 4:
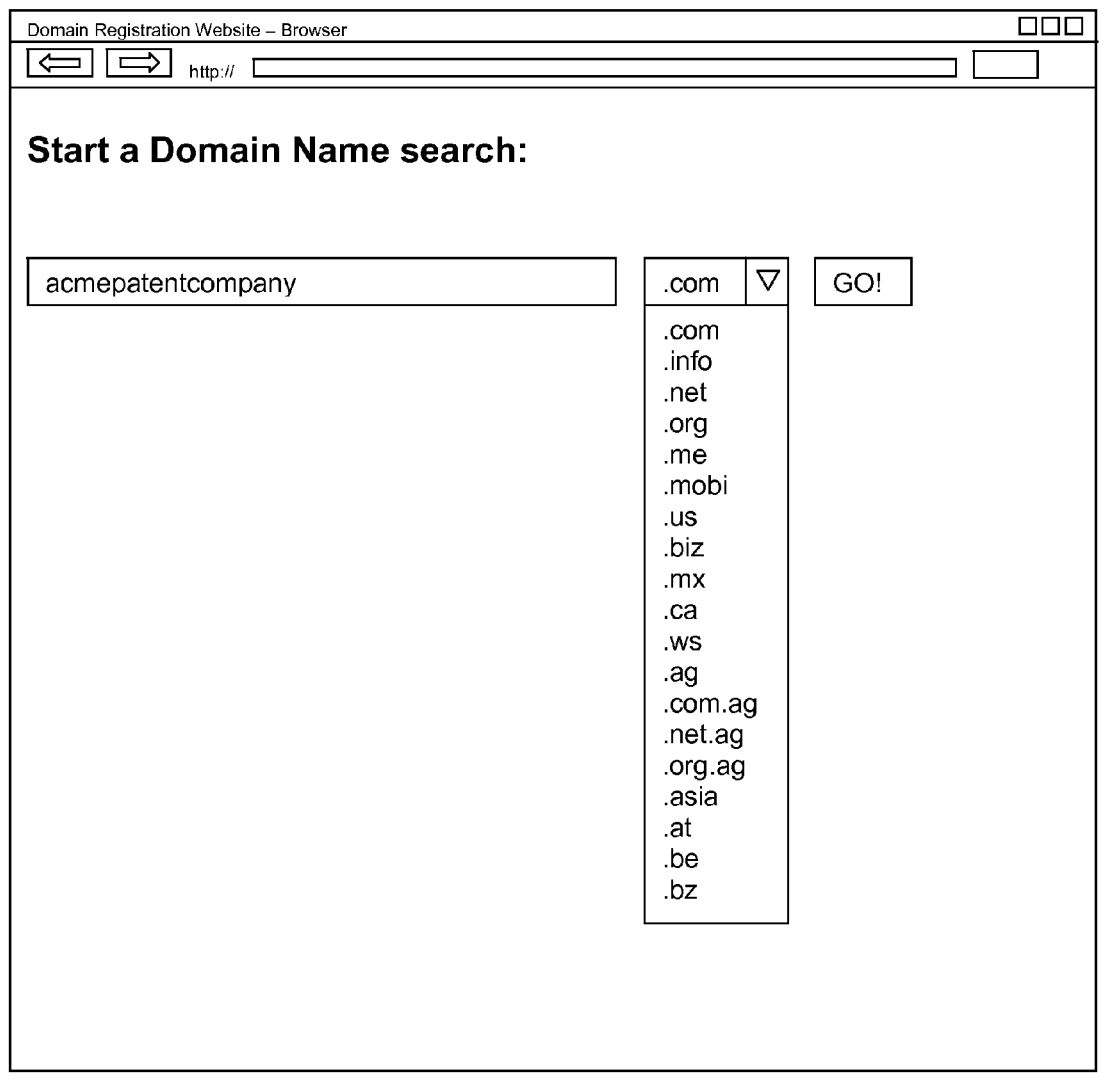
FIG. 4 illustrates a domain registration website.

As can be seen in FIG. 3, the domain containing the .com TLD is at the top of the vertical list, which may be a preferred placement. Similarly, the domain containing the .info TLD has a preferred (i.e., higher) placement than the domain containing the .net TLD. This concept may also apply to a horizontal arrangement of domains, wherein perhaps the preferred placement comprises a left-most, right-most, or more centered position. FIG. 4 illustrates that such preferred placement concepts may be applied within a drop-down box on a domain registration website. In FIG. 4, the .com TLD is at the top of the vertical list within the drop-down, which may be a preferred placement. Similarly, the .info TLD has a preferred (i.e., higher) placement than the .net TLD.

Irrespective of the domain presentation mode on the registration website (e.g., vertical list, horizontal list, drop-down box, etc.), the plurality of domains amongst which a subject domain may be granted preferred placement need not comprise an exhaustive list of domains available for registration. Thus, as a non-limiting example, perhaps only those domains with a bid, quality score, and/or some combination thereof that exceed a predetermined value may be listed for registration on the domain registration website, with domains having better bids, quality scores, and/or some combination thereof receiving preferred placements in relation to other domains. Those domains with a bid, quality score, and/or some combination thereof that does not exceed the predetermined value may, perhaps, not appear on the registration website.

Returning to FIG. 2, the method further may comprise the step of generating, perhaps by software and/or scripts running on at least one server computer communicatively coupled to a network, a quality score for the domain (Step 110). The quality score may comprise any metric (e.g., the result of a quantitative or qualitative analysis, an alphanumeric score, a star-rating system, etc.) that indicates the relative value of a subject domain when compared to a plurality of other domains. As a non-limiting example, the quality score may be a function of a price, a performance, a market share, and/or a customer desirability of the domain.

Thus, variables that may factor into the quality score may comprise, as a non-exclusive list: (1) domain Zone File availability; (2) registry-registrar connection quality; (3) quality of registry customer or technical support provided to registrars; (4) the existence of domain registration requirements implemented by the registry that may limit the pool of available domain registrants; (5) costs and fees charged to the registrar by the registry for domain registration (for both new and renewal registrations); (6) projected domain growth in market; (7) the domain's percentage of new domain registrations; (8) the number of domains registered at a specific registrar that include the subject domain; (9) WHOIS data availability and quality (i.e., contact data integrity and validity); (10) domain registry thickness (i.e., is the domain administered by a thick or thin registry?); (11) frequency in which domains comprising the subject TLD are the subject of availability checks; (12) overall domain registry reliability and availability (e.g., uptime, command execution success/failure, and domain registration refund percentages); (13) domain registration period in years supported at the registry; (14) domain renewal rate; and (15) domain transfer support and ease (i.e., does the registry support simple, automated domain transfers? Or is it difficult to move domains between registrars?).

Alternatively, the quality score could comprise a single variable, such as the total volume (i.e., number) of domain registrations, perhaps, the number of domains registered by a domain registrar within a 30-day period. The quality score could also comprise a number of domain registration years (DRYs) or a number of DRYs registered by a domain registrar within a 30-day period. A DRY may comprise a domain multiplied by the number of years for which it is registered. For example, a domain registered for 5 years would comprise 5 DRYs. Three domains registered for 3-year terms each would comprise 9 DRYs.

The preferred placement may then be determined (perhaps by software and/or scripts running on at least one server), which may be based upon the bid and/or the quality score (Step 120). As described in detail above, the preferred placement may comprise any location on the domain registration website that may be more likely to attract the attention of a user than an other location. As a non-limiting example, the preferred placement may be determined by a mathematical function that calculates a score based upon the dollar value of a bid and the numerical value of a quality score. A better (e.g., higher) score may result in a better (e.g., more optimal) placement on a domain registration website.

Figure 5:
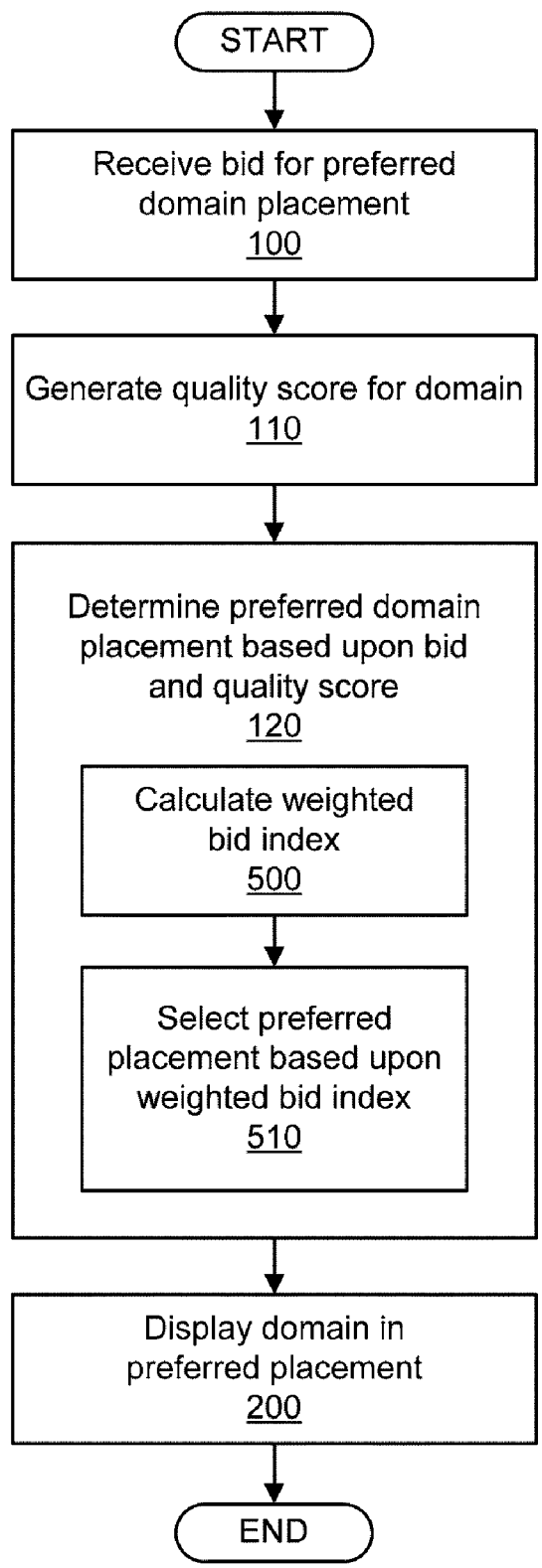
FIG. 5 is a flow diagram illustrating a possible embodiment of a method for determining preferred domain positioning on a registration website.

FIG. 5 illustrates an embodiment of a method for determining preferred domain positioning on a registration website, wherein the determining step C) further comprises calculating a weighted bid index for the domain (which may be a function of the bid and the quality score) (Step 500), and selecting the preferred placement based upon the weighted bid index (Step 510). The weighted bid index may be calculated by any algorithm or mathematical function using both the bid received in step 100 and the quality index generated in Step 110. The weighted bid index may, by combining these variables, generate an index upon which the domain's preferred placement on a website may be located.

As a non-limiting example, the weighted bid index may be calculated according to the following formula: weighted bid index=(volume of domain registrations registered by a domain registrar within a 30-day period)*(financial value of the bid+predetermined financial credit). Using the .com TLD for example, if Registrar A registered 1000 .com domains in the past 30 days, the .com Registry bid $100 for Registry A to offer.com domains on its registration website, and Registy A used a predetermined credit of $1, the weighted bid index would be: (1000)*(100+1), or 101,000. TLDs with higher weighted bid indices would obtain better preferred placement on the website, while TLDs with lesser weighted bid indices would obtain less preferential placement.

The domain may then be displayed in the preferred placement (Step 200) on the domain registration website (perhaps by software and or scripts running on at least one server) for registration. Domain registration may be accomplished by any domain registration method known in the art or developed in the future, perhaps via a website-enabled domain purchase and registration system, such as that described in detail above and/or may be available on GODADDY.COM's website. Alternatively, domain registration may be accomplished via human to human communication, perhaps via a telephone call or in-person meeting. Domains may be registered by, as non-limiting examples, any individual or entity including, but not limited to a domain registry, domain registrar, hosting provider, and/or software application developer or distributor.

Domain registration availability may be determined at any point in the methods described herein, perhaps by software and/or scripts running on at least one server that may ascertain whether the domain has already been registered by checking the SRS database associated with the domain. As an additional non-limiting example, any of the systems and/or methods may be used as described in U.S. Patent Application Publication No. 2004-0199520 entitled: "Method for Checking the Availability of a Domain Name," which is assigned to The Go Daddy Group, Inc. and incorporated herein by reference. Alternatively, any method of determining domain registration availability known in the art or developed in the future may be used.

Figure 6:
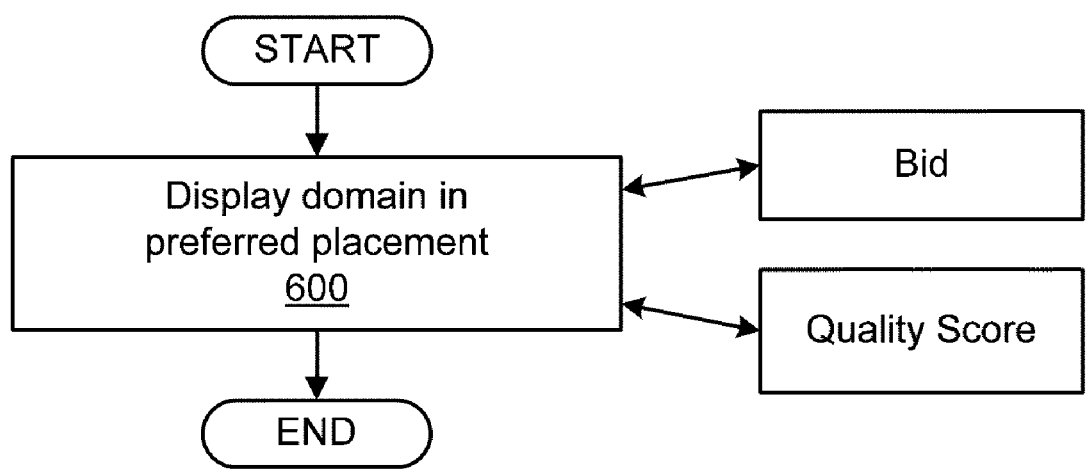
FIG. 6 is a flow diagram illustrating a possible embodiment of a method for determining preferred domain positioning on a registration website.
Figure 7:
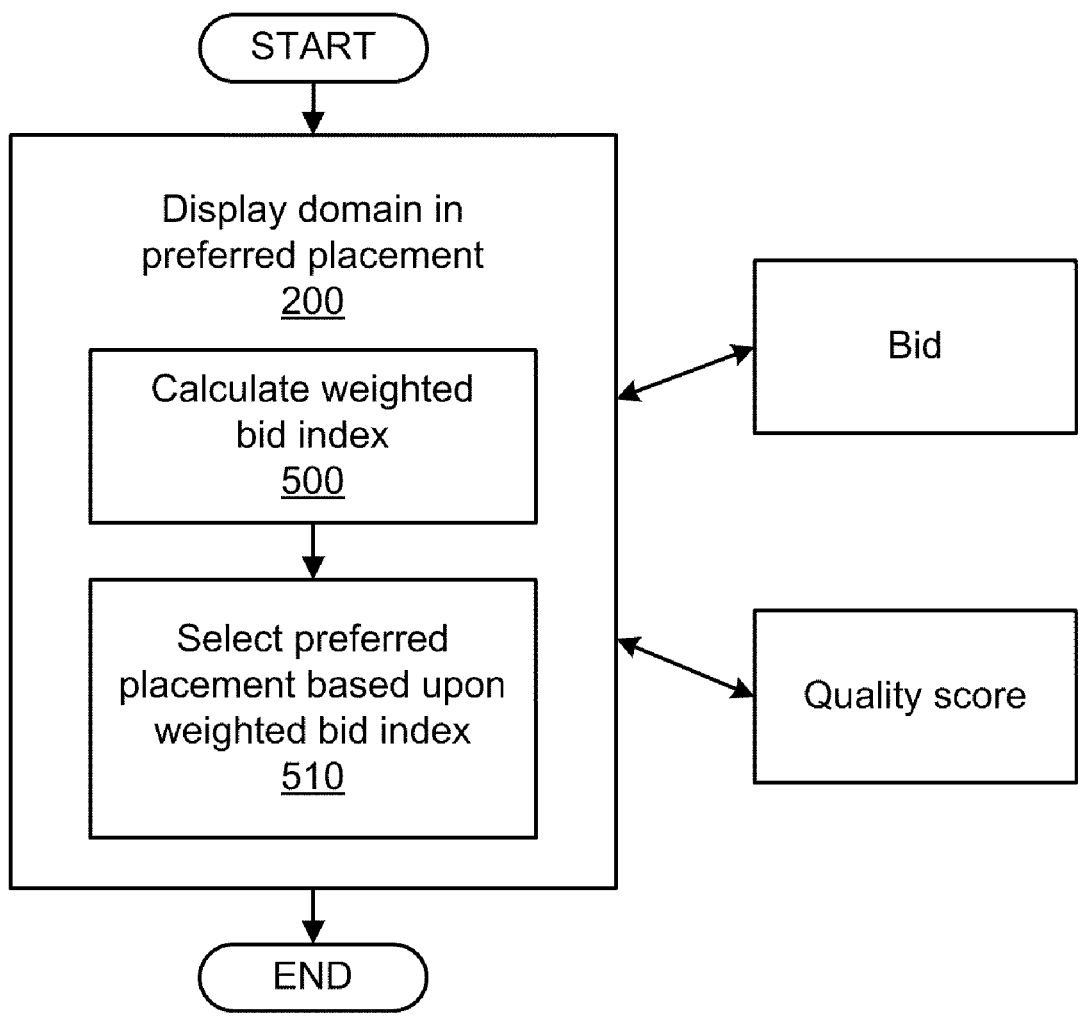
FIG. 7 is a flow diagram illustrating a possible embodiment of a method for determining preferred domain positioning on a registration website.

FIG. 6 illustrates a streamlined embodiment of a method for determining preferred domain positioning on a registration website that comprises the step of displaying, by at least one server computer communicatively coupled to a network, a domain administered by a registry in a preferred placement on a domain registration website, wherein the preferred placement may be based upon a bid from a registry that may be seeking the preferred placement and a quality score for the domain (Step 600). This step may be accomplished, perhaps by servers and/or scripts running on at least one server computer, by displaying a domain in a preferred placement on the domain registration website (Step 200), wherein the preferred placement is ascertained as described in Step 600, or perhaps by implementing Steps 100, 110, 120, 500, 510, and/or any combination thereof. FIG. 7 illustrates a specific embodiment wherein the displaying step further comprises calculating a weighted bid index for the domain (which may be a function of the bid and the quality score) (Step 500), and selecting the preferred placement based upon the weighted bid index (Step 510), as described in detail above.

Tools for Enabling Preferred Domain Positioning on a Registration Website

A tool enabling preferred domain positioning on a registration website may comprise computer-readable media 880 comprising a plurality of instructions 890 that, when executed by at least one server computer 860, may cause the server computer 860 (perhaps via its central processing unit(s) 870) to receive a bid from a registry 800 seeking a preferred placement on a domain registration website 830 for a domain administered by the registry 800 (Step 100), generate a quality score for the domain (Step 110), and determine the preferred placement based upon the bid and the quality score (Step 120). The instructions 890 on the computer-readable media 860 may further cause the server computer 860 to display the domain on the domain registration website 830 in the preferred placement (Step 200).

The computer-readable media 880 may comprise any data storage medium capable of storing instructions for execution by a computing device. It may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage. The instructions 890 may, as non-limiting examples, comprise software and/or scripts stored in the computer-readable media 880 that may be stored locally in a server computer 860 or client computer 820 or, alternatively, may be stored in a highly-distributed format in a plurality of computer-readable media 880 accessible via the network, perhaps via a grid or cloud-computing environment.

Figure 8:
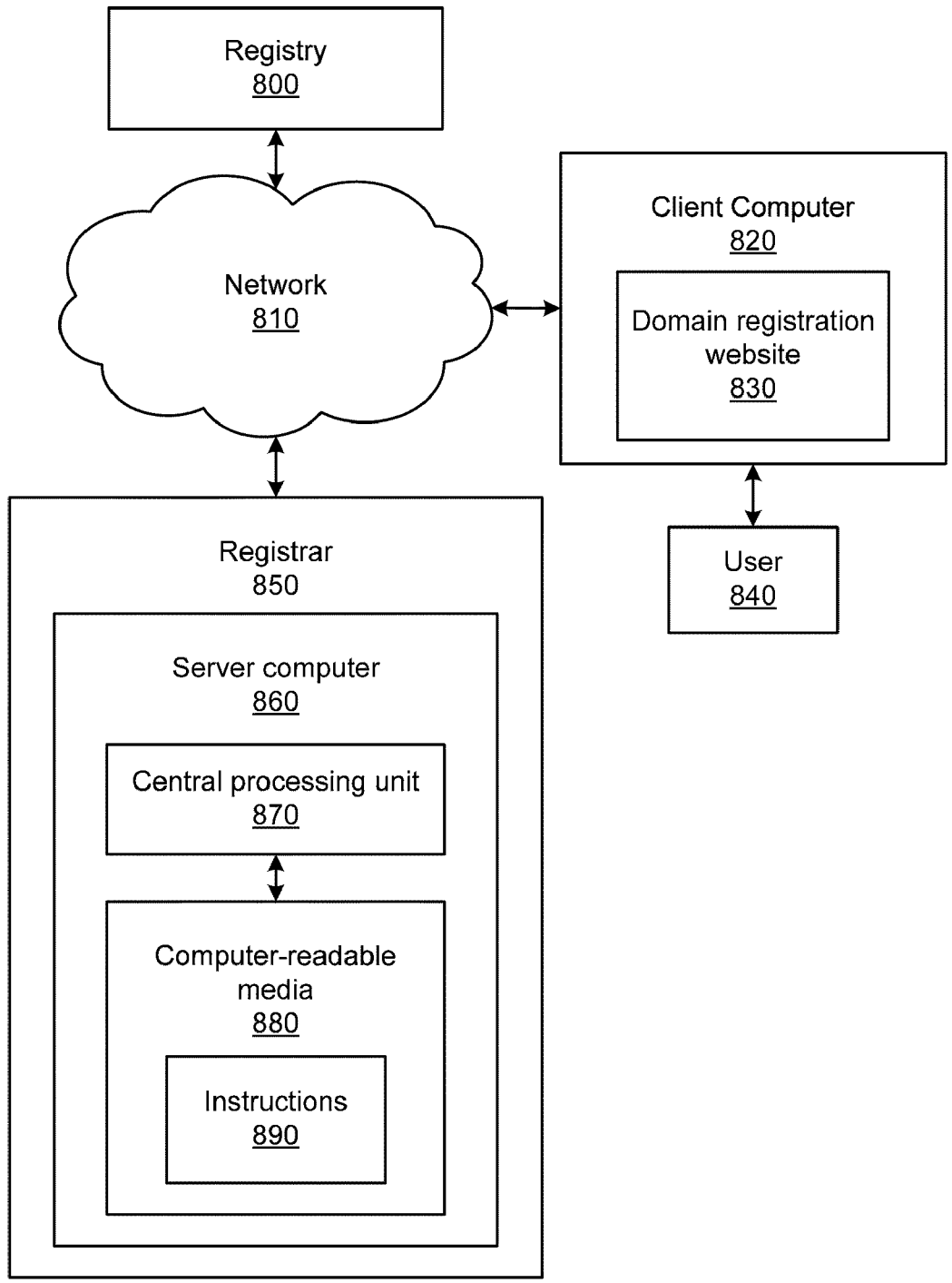
FIG. 8 illustrates a possible embodiment of tools that may be used to enable preferred domain positioning on a registration website.

FIG. 8 illustrates a computing environment in which the described computer-readable media 880 may operate. The illustrated embodiment shows a network 810 communicatively coupling a registry 800, registrar 850, and a client computer 820, through which a user 840 may access a domain registration website 830. The registrar 850 may operate at least one server computer 860, each of which may comprise a central processing unit (CPU) 870 and the computer-readable media 880. The domain registration website 830 accessible via the client computer 820 may be hosted on at least one of the registrar's 850 server computer 860.

The example embodiments herein place no limitation on network 810 configuration or connectivity. Thus, as non-limiting examples, the network 810 could comprise the Internet, the public switched telephone network, the global Telex network, computer networks (e.g., an intranet, an extranet, a local-area network, or a wide-area network), wired networks, wireless networks, or any combination thereof. Examples of client computers 820 that may be used may include a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

Server computers 860 and client computers 820 may be communicatively coupled to the network 810 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The domain registration website 830 may comprise any collection of data and/or files accessible, perhaps via a client computer 820 or server computer 860 communicatively coupled to the network 810. The at least one server computer 860 and/or any other server described herein, could be any computer or program that provides services to other computers, programs, or users either in the same computer or over a computer network. As non-limiting examples, the at least one server computer 860 may comprise an application, communication, mail, database, proxy, fax, file, media, web, peer-to-peer, or standalone server and may use any server format known in the art or developed in the future (possibly a shared hosting server, a virtual dedicated hosting server, a dedicated hosting server, or any combination thereof).

Another tool enabling preferred domain positioning on a registration website may comprise an application programming interface (API) 900 running on at least one server computer 860 communicatively coupled to a network 810. The API 900 may comprise computer-readable code that, when executed by at least one server computer 860, causes the API 900 to receive from a registry 800 a procedure call (i.e., function call) comprising a bid seeking a preferred placement on a domain registration website 830 for a domain administered by the registry 800. Responsive to receipt of the procedure call, the API may display the domain in the preferred placement on the website 830. As described in detail above, the preferred placement may be based upon the bid and a quality score for the domain.

The API 900 may comprise a software-to-software interface that specifies the protocol defining how independent computer programs interact or communicate with each other. The API 900 may allow the bidding party's (e.g., the registry's 800) software to communicate and interact with the described inventions—perhaps over the network 810—through a series of function calls (requests for services). It may comprise an interface running on a server computer 860 that supports function calls made of the described inventions by other computer programs, perhaps those utilized by a registry 800 seeking preferred domain placement on a domain registration website 830. The API 900 may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

Figure 9:
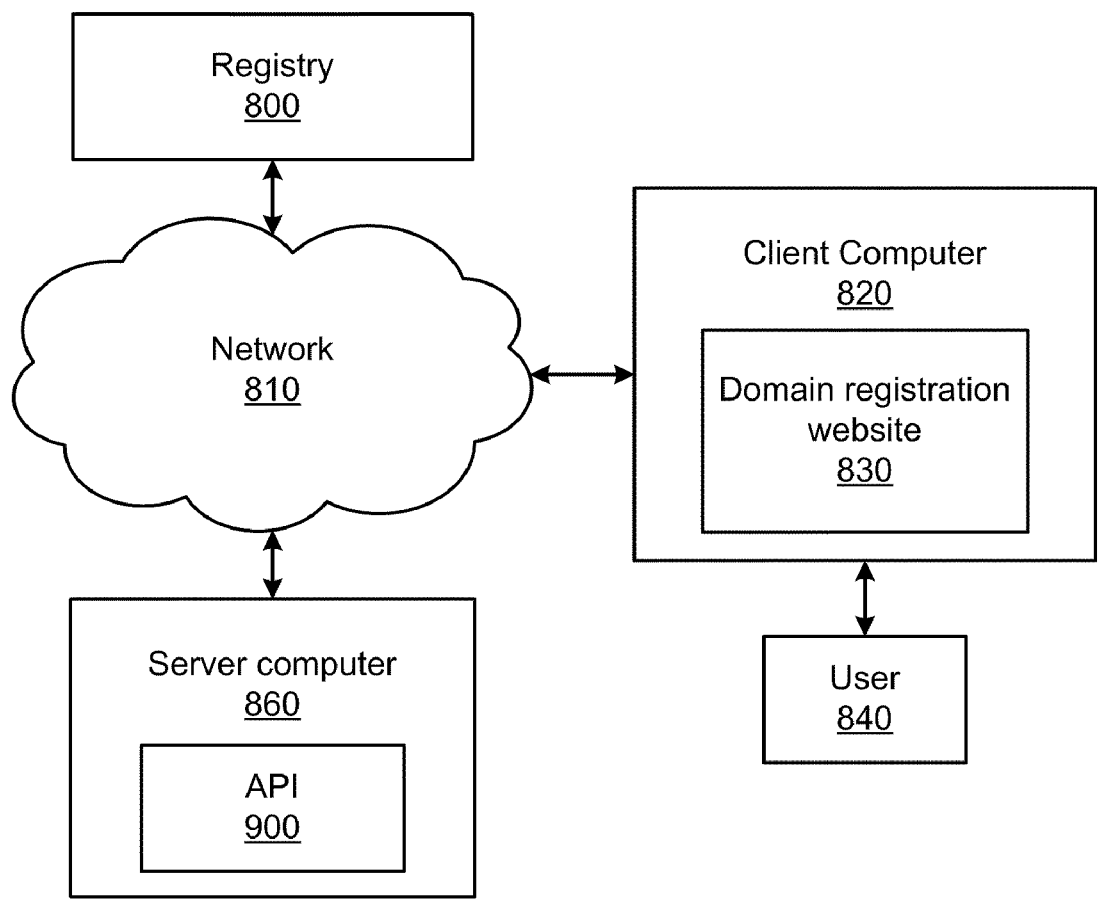
FIG. 9 illustrates a possible embodiment of tools that may be used to enable preferred domain positioning on a registration website.

FIG. 9 illustrates a computing environment in which the described API 900 may operate. The illustrated embodiment shows a network 810 communicatively coupling a registry 800, a server computer 860 on which the API 900 may run, and a client computer 820, through which a user 840 may access a domain registration website 830. With the illustrated embodiment, any individual or entity offering domains for registration may enable preferred domain positioning on a registration website 830 by providing access to the described API 900 via a network 810.

Figure 10:
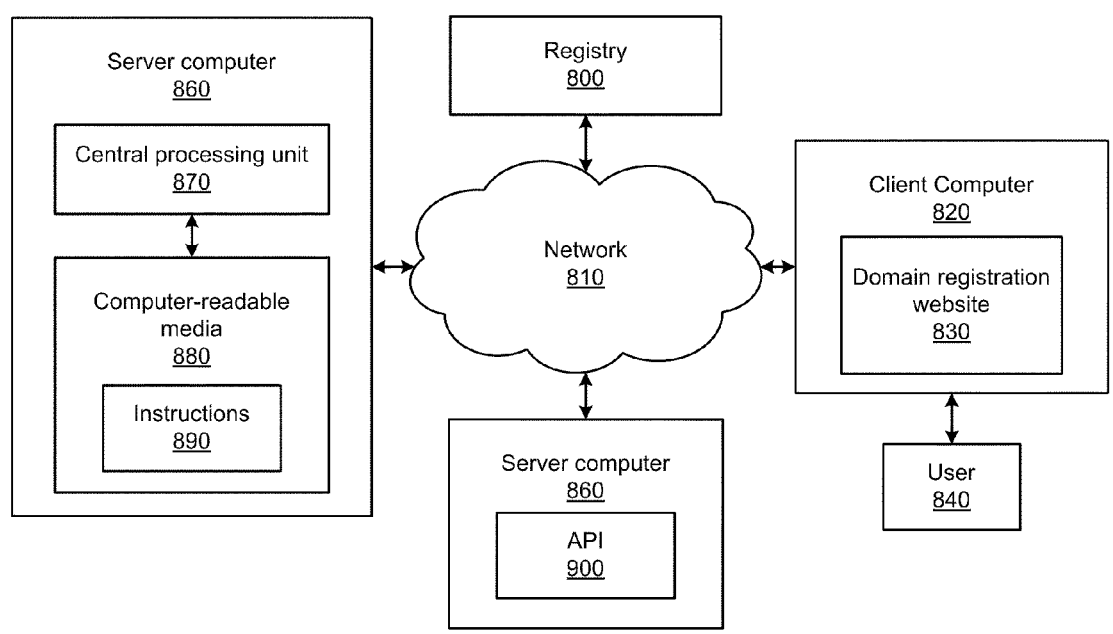
FIG. 10 illustrates a possible embodiment of tools that may be used to enable preferred domain positioning on a registration website.

FIG. 10 illustrates a more detailed, distributed system that may be used to enable preferred domain positioning on a registration website 830. This figure illustrates the above-described API 900 and computer-readable media 880 operating in the same computing environment. The illustrated embodiment is silent as to the entity operating the server computers 860 on which the API 900 and computer-readable media 880 operate. Thus, any individual or entity providing a network 810-coupled server computer 860 may practice the disclosed inventions.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A non-transitory computer-readable media comprising a plurality of instructions that, when executed by at least one server computer, cause at least one of said at least one server computer to:
    A) receive a bid from a registry seeking a preferred placement on a domain registration website for a domain administered by said registry;
    B) generate a quality score for said domain; and
    C) determine said preferred placement based upon said bid and said quality score by:
       i) calculating a weighted bid index for said domain, wherein said weighted bid index is a function of said bid and said quality score calculated according to the following formula: said weighted bid index=(a volume of domain registrations registered by a domain registrar within a 30-day period)*(a financial value of said bid+a predetermined financial credit); and
       ii) selecting said preferred placement based upon said weighted bid index.

2. The non-transitory computer-readable media of claim 1, further causing said at least one server computer to: D) display said domain on said domain registration website in said preferred placement.

3. The non-transitory computer-readable media of claim 2, wherein said domain comprises a second-level domain comprising a root name concatenated to a top-level domain administered by said registry.

4. The non-transitory computer-readable media of claim 3, wherein said second-level domain comprises a premium domain.

5. The non-transitory computer-readable media of claim 3, wherein said second-level domain comprises a suggested domain.

6. The non-transitory computer-readable media of claim 2, wherein said bid comprises an offer
    to pay a remuneration for said preferred placement.

7. The non-transitory computer-readable media of claim 6, wherein said remuneration comprises money to be paid on a cost-per-click, cost-per-impression, cost-per-acquisition, flat fee, or recurring fee basis.

8. The non-transitory computer-readable media of claim 2, wherein said bid comprises an electronic communication received by said at least one server.

9. The non-transitory computer-readable media of claim 2, wherein said bid is received via an application programming interface running on said at least one server and being accessible to said registry via said network.

10. The non-transitory computer-readable media of claim 2, wherein said bid comprises a written document.

11. The non-transitory computer-readable media of claim 2, wherein said bid comprises an oral communication.

12. The non-transitory computer-readable media of claim 2, wherein said registry comprises a domain registry, a domain registrar, or a domain reseller.

13. The non-transitory computer-readable media of claim 2, wherein said registry provides both domain registry and domain registrar services.

14. The non-transitory computer-readable media of claim 2, wherein said preferred placement comprises a location on said domain registration website more likely to attract the attention of a user of said domain registration website than an other location.

15. The non-transitory computer-readable media of claim 2, wherein said preferred placement comprises a preferred placement within a vertical arrangement of a plurality of domains.

16. The non-transitory computer-readable media of claim 2, wherein said preferred placement comprises a preferred placement within a horizontal arrangement of domains.

17. The non-transitory computer-readable media of claim 2, wherein said preferred placement comprises a preferred placement within a drop-down box.

18. The non-transitory computer-readable media of claim 2, wherein said preferred placement comprises a top of a list of a plurality of domains.

19. The non-transitory computer-readable media of claim 2, wherein said preferred placement comprises a higher placement within a list of a plurality of domains than the placement of at least one other of said plurality of domains.

20. The non-transitory computer-readable media of claim 2, wherein said domain registration website is operated by a domain registry, a domain registrar, or a domain reseller.

21. The non-transitory computer-readable media of claim 2, wherein said quality score indicates a relative value of said domain when compared to a plurality of other domains.

22. The non-transitory computer-readable media of claim 2, wherein said quality score is a function of a price, a performance, or a market share of said domain.

23. The non-transitory computer-readable media of claim 2, wherein said quality score comprises a volume of domain registrations.

24. The non-transitory computer-readable media of claim 23, wherein said volume of domain registrations comprises a number of domains registered by a domain registrar, a number of domains registered by a domain registrar within a 30-day period, a number of domain registration years, or a number of domain registration years registered by a domain registrar within a 30-day period.

25. The non-transitory computer-readable media of claim 2, wherein said domain comprises a top level domain.

26. The non-transitory computer-readable media of claim 25, wherein said domain comprises a generic top-level domain.

27. The non-transitory computer-readable media of claim 25, wherein said domain comprises country code top-level domain.

28. An application programming interface running on at least one server computer communicatively coupled to a network comprising computer-readable code that, when executed by said at least one server computer, causes said application programming interface to:
  A) receive from a registry a procedure call comprising a bid seeking a preferred placement on a domain registration website for a domain administered by said registry; and
  B) responsive to receipt of said procedure call, display said domain in said preferred placement, wherein said preferred placement being based upon said bid and a quality score for said domain is determined by:
  i) calculating a weighted bid index for said domain, wherein said weighted bid index is calculated according to the following formula: said weighted bid index=(a volume of domain registrations registered by a domain registrar within a 30-day period)*(a financial value of said bid+a predetermined financial credit); and
  ii) selecting said preferred placement based upon said weighted bid index.

29. The application programming interface of claim 28, wherein said domain comprises a top-level domain.

30. The application programming interface of claim 29, wherein said domain comprises a generic top-level domain.

31. The application programming interface of claim 29, wherein said domain comprises country code top-level domain.

32. The application programming interface of claim 28, wherein said domain comprises a second-level domain comprising a root name concatenated to a top-level domain administered by said registry.

33. The application programming interface of claim 32, wherein said second-level domain comprises a premium domain.

34. The application programming interface of claim 32, wherein said second-level domain comprises a suggested domain.

35. The application programming interface of claim 28, wherein said bid comprises an offer to pay a remuneration for said preferred placement.

36. The application programming interface of claim 35, wherein said remuneration comprises money to be paid on a cost-per-click, cost-per-impression, cost-per-acquisition, flat fee, or recurring fee basis.

37. The application programming interface of claim 28, wherein said registry comprises a domain registry, a domain registrar, or a domain reseller.

38. The application programming interface of claim 28, wherein said registry provides both domain registry and domain registrar services.

39. The application programming interface of claim 28, wherein said preferred placement comprises a location on said domain registration website more likely to attract the attention of a user of said domain registration website than an other location.

40. The application programming interface of claim 28, wherein said preferred placement comprises a preferred placement within a vertical arrangement of a plurality of domains.

41. The application programming interface of claim 28, wherein said preferred placement comprises a preferred placement within a horizontal arrangement of domains.

42. The application programming interface of claim 28, wherein said preferred placement comprises a preferred placement within a drop-down box.

43. The application programming interface of claim 28, wherein said preferred placement comprises a top of a list of a plurality of domains.

44. The application programming interface of claim 28, wherein said preferred placement comprises a higher placement within a list of a plurality of domains than the placement of at least one other of said plurality of domains.

45. The application programming interface of claim 28, wherein said domain registration website is operated by a domain registry, a domain registrar, or a domain reseller.

* * * * *